United States Patent [19]
Wardle et al.

[11] Patent Number: 5,516,854
[45] Date of Patent: May 14, 1996

[54] METHOD OF PRODUCING THERMOPLASTIC ELASTOMERS HAVING ALTERNATE CRYSTALLINE STRUCTURE SUCH AS POLYOXETANE ABA OR STAR BLOCK COPOLYMERS BY A BLOCK LINKING PROCESS

[75] Inventors: Robert B. Wardle, Logan; W. Wayne Edwards, Tremonton; Jerald C. Hinshaw, Ogden, all of Utah

[73] Assignee: Thiokol Corporation, Ogden, Utah

[21] Appl. No.: 559,179

[22] Filed: Jul. 27, 1990

[51] Int. Cl.⁶ .......................... C08G 18/12; C08G 65/04
[52] U.S. Cl. .................................................. 525/410
[58] Field of Search ............................................. 525/410

[56] References Cited

U.S. PATENT DOCUMENTS

| | | | |
|---|---|---|---|
| 4,361,526 | 11/1982 | Allen | 264/3 C |
| 4,393,199 | 7/1983 | Manser | 528/408 |
| 4,483,978 | 11/1984 | Manser | 528/408 |
| 4,806,613 | 2/1989 | Wardle | 528/59 |
| 4,952,644 | 8/1990 | Wardle et al. | 525/410 |
| 5,210,153 | 5/1993 | Manser et al. | 525/410 |
| 5,362,848 | 11/1994 | Archibald et al. | 528/414 |

*Primary Examiner*—Edward A. Miller
*Attorney, Agent, or Firm*—Madson & Metcalf; Ronald L. Lyons

[57] ABSTRACT

A method of preparing a thermoplastic elastomer having A blocks and at least one B block, wherein said A blocks are crystalline at temperatures below about 60° C. and said B block is amorphous at temperatures above about −20° C., said A blocks each being polyethers derived from monomers of oxetane and its derivatives and/or tetrahydrofuran and its derivatives, the method comprising:

providing monofunctional hydroxyl terminated A blocks which are crystalline at temperatures below about 60° C. and separately providing di-, tri- or tetrafunctional hydroxyl terminated B blocks which are amorphous at temperatures above about −20° C., end-capping said A blocks by separately reacting said A blocks with a difunctional diisocyanate in which one isocyanate moiety is at least about five times as reactive with the terminal hydroxyl group of the A blocks as the other isocyanate moiety, whereby the more reactive isocyanate moiety tends to react with the terminal hydroxyl group of the A blocks, leaving the less reactive isocyanate moiety free and unreacted, and adding di-, tri- or tetrafunctional B block to the end-capped A blocks at approximately the stoichiometric ratios that they are intended to be present in the thermoplastic elastomer such that the free and unreacted isocyanate moiety on the end-capped A block reacts with a functional moiety of the B block to produce ABA or $A_nB$ thermoplastic elastomers.

13 Claims, No Drawings

METHOD OF PRODUCING THERMOPLASTIC ELASTOMERS HAVING ALTERNATE CRYSTALLINE STRUCTURE SUCH AS POLYOXETANE ABA OR STAR BLOCK COPOLYMERS BY A BLOCK LINKING PROCESS

The present invention relates to an improved novel method for producing thermoplastic ABA or $A_nB$ type polymers which are useful as binders in high-energy compositions, such as propellants, explosives, gasifiers, or the like.

BACKGROUND OF THE INVENTION

Solid high-energy compositions, such as propellants, explosives, gasifiers, or the like, comprise solid particulates, such as fuel particulates and/or oxidizer particulates, dispersed and immobilized throughout a binder matrix comprising an elastomeric polymer.

Conventional solid composite propellant binders utilize cross-linked elastomers in which prepolymers are cross-linked by chemical curing agents. As outlined in detail in U.S. Pat. No. 4,361,526, there are important disadvantages to using cross-linked elastomers as binders. Cross-linked elastomers must be cast within a short period of time after addition of the curative, which time period is known as the "pot life". Disposal of a cast, cross linked propellant composition is difficult, except by burning, which poses environmental problems. Furthermore, current state-of-the-art propellant compositions have serious problems that include, but are not limited to: use of nonenergetic binders, high end-of-mix viscosities, thermally labile urethane linkages, and extreme vulnerability to unscheduled detonation.

Cross-linked elastomers in which prepolymers are polyethers derived from oxetane derivatives and tetrahydrofuran (THF) are described in U.S. Pat. No. 4,483,978, issued to Manser. Urethane curing is achieved with isocyanates and additional cross-linking agents.

In view of inherent disadvantages of cross-linked elastomeric polymers as binder materials, there has been considerable interest in developing thermoplastic elastomers suitable as binders for solid, high-energy compositions. However, many thermoplastic elastomers fail to meet various requirements for propellant formulations, particularly the requirement of being processible below about 120° C., it being desirable that a thermoplastic elastomeric polymer for use as a binder in a high-energy system have a melting temperature of between about 60° C. and about 120° C. The lower end of this range relates to the fact that the propellant composition may be subject to somewhat elevated temperatures during storage and use, and it is undesirable that significant softening of the propellant composition occur. The upper end of this range is determined by the instability, at elevated temperatures, of many components which ordinarily go into propellant compositions, particularly oxidizer particulates and energetic plasticizers. Many thermoplastic elastomers exhibit high melt viscosities which preclude high solids loading and many show considerable creep and/or shrinkage after processing. Thermoplastic elastomers (TPE's) typically obtain their thermoplastic properties from segments that form glassy domains which may contribute to physical properties adverse to their use as binders. Thermoplastic elastomers are block copolymers with the property of forming physical cross-links at predetermined temperatures. The classical TPE, e.g., Kraton, obtains this property by having the glass transition point of one component block above room temperature. At temperatures below 109° C., the glassy blocks of Kraton form glassy domains and thus physically cross-link the amorphous segments. The strength of these elastomers depends upon the degree of phase separation. Thus, it remains desirable to have controlled, but significant, immiscibility between the two types of blocks, which is a function of their chemical structure and molecular weight. On the other hand, as the blocks become more immiscible, the melt viscosity increases, thus having a deleterious effect on the processability of the material. Above-mentioned U.S. Pat. No. 4,361,526 proposes a thermoplastic elastomeric binder which is a block copolymer of a diene and styrene, the styrene blocks providing a meltable crystal structure and the diene blocks imparting rubbery or elastomeric properties to the copolymer. This polymer requires processing with a solvent; solvent processing is undesirable in that the propellant cannot be cast in a conventional manner, e.g., into a rocket motor casing. Furthermore, solvent-based processing presents problems with respect to removal and recovery of solvent.

It has been proposed to produce thermoplastic elastomers having both A and B blocks, each derived from cyclic ethers, such as oxetane and oxetane derivatives and tetrahydrofuran (THF) and tetrahydrofuran derivatives. The monomer or combination of monomers of the A blocks are selected for providing a crystalline structure at usual ambient temperatures, whereas the monomer or combination of monomers of the B blocks are selected to ensure an amorphous structure at usual ambient temperatures. Such proposed thermoplastic elastomers (TPE's) include ABA triblock polymers, $(AB)_n$ polymers in which A and B blocks alternate and $A_nB$ star polymers in which several A blocks are linked to a central, multi-functional B block. Such TPE's are thought to be highly suitable for use in binder systems for high-energy compositions, such as propellants, explosives, gasifiers, or the like. The A and B blocks of such polymers are mutually miscible in a melt of the polymer. The melt viscosities of such a TPE decreases rapidly as the temperature is raised above the melting point of the crystalline A blocks, contributing to its processability. Furthermore, a thermoplastic elastomer based upon crystalline domains exhibits advantageous solvent-resistance and minimal setup shrinkage. Such a TPE can be formulated to have a melting temperature which falls within a desirable 60° C. to 120° C. range, to be chemically stable up to 120° C. and above, to have a low melt viscosity, to be compatible with existing components of high-energy compositions, to retain mechanical integrity when filled with solids up to 90 percent w/w, and to have a glass transition temperature below 20° C. and even below −40° C.

Two methods have been previously proposed for producing such TPE's. According to one proposed method, ABA triblock or $(AB)_n$ polymers may be joined together through a block linking technique in which a linking moiety, such as phosgene or an isocyanate, is reacted with both ends of the middle (B) block and the end (A) blocks are subsequently reacted with the linking group (x). Generally the reaction is:

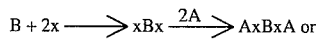

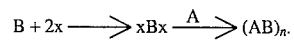

According to the other proposed method, an ABA polymer is formed by systematic monomer addition. For example, the A monomer may be reacted with an initiating adduct to form an A block by cationic polymerization and the reaction allowed to proceed until monomer A is substantially exhausted. Then the monomer or monomers of block B are added and polymerization proceeds from the active end of block A. When the monomers of block B are substantially exhausted, additional monomers of block A are added, and polymerization proceeds from the active end of block B. The reaction is represented by the equation:

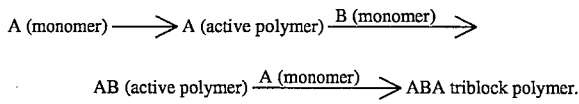

Alternatively, a difunctional initiator could be used to initiate the polymerization of the B block. When the A block is added, the polymerization would proceed from both active ends of the B block. The reaction is represented by the equation:

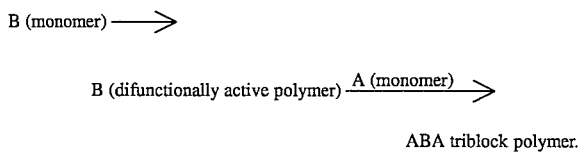

By selection of appropriate block functionality or by repetition of steps, these methods are also proposed as being suitable for producing $(AB)_n$ polymers and $A_nB$ star polymers.

Both of these methods of producing polyether TPE's have proven less than satisfactory. Joining of A and B blocks is found to be minimal at best by either of the two methods described above; accordingly, an improved process for producing TPE's having both crystalline A polyether blocks and amorphous B polyether blocks is desired.

In accordance with U.S. Pat. No. 4,806,613, issued to Robert Wardle, a three stage method is provided for forming thermoplastic elastomers having polyether crystalline A blocks and polyether amorphous B blocks. Each of the polyether blocks A and B are individually synthesized. The A blocks and B blocks are each separately end-capped with a diisocyanate in which one isocyanate moiety is substantially more reactive with active groups on the blocks than is the other isocyanate moiety. Finally, the end-capped blocks are mixed and reacted with a difunctional linking chemical in which each function on the linking chemical is isocyanate-reactive and sufficiently unhindered to react with a free isocyanate moiety on a capped block. However, to link difunctional A and B blocks and form exclusively ABA elastomers by controlling stoichiometry of the blocks is statistically unrealistic.

It is highly desirable that an even more effective, efficient and simpler method be available for unambiguously producing such thermoplastic ABA and $A_nB$ elastomers having polyether crystalline A blocks and polyether amorphous B blocks, which process does not require three stages, does not require the use of the difunctional linking compound of U.S. Pat. No. 4,806,613, and can produce substantially exclusively ABA or $A_nB$ elastomers.

SUMMARY OF THE INVENTION

In accordance with the present invention a novel one pot method is provided for forming thermoplastic elastomers having polyether crystalline A blocks and a polyether amorphous B block. After individual synthesis of monofunctional A blocks and di-, tri- or tetrafunctional B blocks, the monofunctional crystalline A block is end-capped with a difunctional isocyanate in which one of the isocyanate moieties is substantially more reactive with the functional group on the blocks than is the other diisocyanates moiety, whereby the more reactive isocyanate moiety tends to react the functional group of the A blocks, leaving the less reactive isocyanate moiety free and unreacted and thereafter adding di-, tri- or tetrafunctional B blocks to the end-capped A blocks at approximately the stoichiometric ratios they are intended to be present in the thermoplastic elastomer such that the free and unreacted isocyanate moiety on the end-capped monofunctional A block reacts with a functional moiety of the B blocks to produce ABA and $A_nB$ thermoplastics elastomers.

DETAILED DESCRIPTION OF CERTAIN PREFERRED EMBODIMENTS

The method of the present invention is directed to producing thermoplastic elastomeric polymers, in which at least one B block is flanked by at least one pair of A blocks. The A blocks are crystalline at temperatures below about 60° C. and preferably at temperatures below about 75° C.; the B blocks are amorphous at temperatures down to about −20° C. and preferably down to about −40° C. Each of the A and B blocks are polyethers derived from cyclic ethers, including oxetane and oxetane derivatives and THF an THF derivatives. The polymers melt at temperatures between about 60° C. and about 120° C. and preferably between about 75° C. and about 100° C. The A and B blocks are mutually miscible in the melt; consequently, the melt viscosity of the block polymer decreases rapidly as the temperature is raised above the melting point, whereby high energy formulations may include high solids content, e.g., up to about 90% by weight of solid particulates, and be easily processed. The invention includes TPE block polymers, such as ABA triblock polymers and $A_nB$ star polymers. Contributing to the miscibility of the A and B blocks is their similar chemical structure. Oxetane and tetrahydrofuran (THF) monomer units used in forming the blocks of the present invention have the general formula:

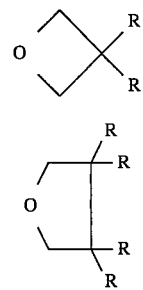

wherein the R groups are the same or different and are selected from moieties having the general formula: $-(CH_2)_n X$, where n is 0–10 and X is selected from the group consisting of —H, —NO$_2$, —CN, —Cl, —F, —O-alkyl, —OH, —I, —ONO$_2$, —N(NO$_2$)-alkyl, —C≡CH, —Br, —CH=CH(H or alkyl), —O—CO—(H or alkyl), —CO$_2$—(H or alkyl), —N(H or alkyl)$_2$, —O—(CH$_2$)$_{1-5}$—O—(CH$_2$)$_{0-8}$—CH$_3$, and —N$_3$.

Examples of oxetane used in forming block polymers in accordance with the invention include but are not limited to:

| | |
|---|---|
| BEMO | 3,3-bis(ethoxymethyl)oxetane, |
| BCMO | 3,3-bis(chloromethyl)oxetane, |
| BMMO | 3,3-bis(methoxymethyl)oxetane, |
| BFMO | 3,3-bis(fluoromethyl)oxetane, |
| HMMO | 3-hydroxymethyl-3-methyloxetane, |
| BAOMO | 3,3-bis(acetoxymethyl)oxetane, |
| BHMO | 3,3-bis(hydroxymethyl)oxetane, |
| OMMO | 3-octoxymethyl-3-methyloxetane, |
| BMEMO | 3,3-bis(methoxyethoxymethyl)oxetane, |
| CMMO | 3-chloromethyl-3-methyloxetane, |
| AMMO | 3-azidomethyl-3-methyloxetane, |
| BIMO | 3-3-bis(iodomethyl)oxetane, |
| IMMO | 3-iodomethyl-3-methyloxetane, |
| PMMO | 3-propynomethylmethyloxetane, |
| BNMO | 3,3-bis(nitratomethyl)oxetane, |
| NMMO | 3-nitratomethyl-3-methyloxetane, |
| BMNAMO | 3,3-bis(methylnitraminomethyl)oxetane, |
| MNAMMO | 3-methylnitraminomethyl-3-methyloxetane, and |
| BAMO | 3,3-bis(azidomethyl)oxetane. |

Forming TPE's in accordance with the invention requires (1) formation of a polymer, which is to serve as the A blocks, that is crystalline in nature with a relatively elevated melting point, i.e., between about 60° C. and about 120° C., preferably near 80° C. and (2) formation of a polymer, which is to serve as the B block, that is amorphous in structure having a glass transition temperature ($T_g$) below about −20° C. and preferably below about −40° C.

Examples of suitable crystalline A blocks include polyBEMO, polyBMMO and polyBFMO. Both polyBEMO and polyBMMO melt at between 80° C. and 90° C., and polyBFMO has a melting point of about 105° C. These crystalline homopolymers may be selected as A blocks according to the particular binder requirements. For example, polyBMMO has a higher ether oxygen content than polyBEMO, which may be advantageous in particular applications. Although the 80° C. to 90° C. melting point of polyBMMO and polyBEMO are generally preferred, the higher melting temperature of polyBFMO may be preferred in particular binder applications. Also polyBFMO has a higher density than either polyBEMO or polyBMMO which may suit particular binder applications.

The advantage of crystalline hard block is shown in the dynamic mechanical property Table below.

| RDS DATA | | | |
|---|---|---|---|
| | Temp (C.) | G' | G" |
| 1 | 25 | 363400000 | 52500000 |
| 2 | 30 | 318600000 | 47900000 |
| 3 | 35 | 277200000 | 43300000 |
| 4 | 40 | 233000000 | 38000000 |
| 5 | 45 | 181700000 | 31300000 |
| 6 | 50 | 133800000 | 24300000 |
| 7 | 54 | 107500000 | 20400000 |
| 8 | 56 | 97400000 | 18700000 |
| 9 | 58 | 87100000 | 17000000 |
| 10 | 60 | 76800000 | 15200000 |
| 11 | 62 | 66500000 | 13400000 |
| 12 | 64 | 57300000 | 11800000 |
| 13 | 66 | 46700000 | 9800000 |
| 14 | 68 | 36500000 | 7800000 |
| 15 | 70 | 26400000 | 5700000 |
| 16 | 72 | 16000000 | 3560000 |
| 17 | 74 | 6200000 | 1440000 |
| 18 | 76 | 400000 | 160000 |

G' = Storage Modulus
G" = Loss Modulus

This Table shows that a TPE containing a crystalline block maintains good mechanical properties to within a very few degrees of the melting point. At the melting point, the material softens and flows with a relative low viscosity.

The soft or amorphous B block is selected from homopolymers and copolymers (or higher number mixed polymers) found to have low glass transition temperatures. An important class of amorphous blocks in accordance with the invention are copolymers of THF and simple oxetane monomers, including those monomers which form the crystalline homopolymers described above. For example, THF/BEMO, THF/BMMO and THF/BFMO copolymers have been found to be amorphous at ambient temperatures, having low glass transition temperatures. The physical characteristics of these copolymer blocks depend upon the relative proportions of THF and the oxetane monomer, the molar ratios ranging from between 20 and about 80 percent THF monomers.

Oxetanes having long or bulky side chains may be copolymerized with THF to provide B blocks which are "internally plasticized". That is, the side chains (R) sterically hinder close packing of polymer chains, contributing to low viscosity and low $T_g$ of the copolymer. Two oxetane monomers which provide internal plasticization in a THF/oxetane copolymer are OMMO and BMEMO. Again, the THF:oxetane molar ratio ranges from about 80:20 to about 20:80.

In addition, homopolymers and copolymers of various energetic oxetanes exhibit amorphous characteristics. B blocks formed with energetic polymers are useful in forming energetic thermoplastic elastomers. High energy polymers and copolymers include, but are not limited to, polyNMMO, polyBAMO/AMMO, polyBAMO/NMMO and polyAMMO, the monomers used to form the copolymers being used throughout the entire spectrum of molar ratios, depending upon the physical and energetic characteristics required of the B block. In using the energetic homopolymer or copolymer B blocks to form (AB) block polymers, it may be preferred to use non-energetic A blocks, such as the polyBEMO, polyBMMO and polyBFMO blocks, described above, in order to ensure low vulnerability of the high-energy composition formed therefrom. However, where higher energy binders are desired or required, it is considered to be within the scope of the present invention to have A blocks similarly formed with high-energy monomers. An example would be polyBAMO.

The properties of the block polymer depends upon the molecular weights of the individual blocks and the total molecular weights. Typically the A blocks have molecular weights ranging from about 3000 to about 12500 whereas the B blocks have molecular weights ranging from about 5000 to about 50,000. Preferably, the A blocks are shorter than the B blocks, the total molecular weights of the A blocks typically ranging from about ⅕ to 1 times the molecular weight of the B block in an ABA triblock polymer or the molecular weight of B blocks in an $A_nB$ star polymer. Typically, the A blocks will have generally similar size. The preferred sizes of the A and B blocks for any particular binder application must be empirically determined.

Thermoplastic elastomers produced in accordance with the present invention are admixed with other components of a high-energy formulation, such as a propellant formulation. The binder system, in addition to the TPE, may optionally contain a plasticizer at a plasticizer-to-TPE ratio of up to about 2.5:1, suitable high-energy plasticizers including nitroglycerine, butanetriol trinitrate (BTTN), and trimethylolethane trinitrate (TMETN). If the block TPE is internally plasticized, e.g., with OMMO or BEMO as described above, there is less need for external plasticizers, although high-energy nitroester plasticizers may be used to enhance the energy value of the binder system as a whole. The binder system may also contain a minor amount of a wetting agent or lubricant that enables higher solids loading.

The solids content of the high-energy composition generally ranges from about 50 wt. percent to about 90 wt. percent, higher solids loading generally being preferred so long as this is consistent with structural integrity. The solids include fuel material particulates, such as ammonium perchlorate, cyclotetramethylene tetranitramine (HMX) and cyclotrimethylene trinitramine (RDX). In addition, the high-energy composition may include minor amounts of additional components known in the art, such as bonding agents, burn rate modifiers, etc.

The thermoplastic elastomer may be mixed with the solids and other components of high-energy formulation at temperatures above its melting temperature. Blending is done in conventional mixing apparatus. Because of the low viscosities of the molten polymer, no solvents are required for blending or other processing, such as extrusion. An advantage of using thermoplastic elastomers for binders is mixing, although from an energy efficiency standpoint, this is generally desirable.

An important advantage of having a propellant which is meltable is that the propellant from an outdated missile can be melted down and reused. At the time of such remelting, the propellant might be reformulated, e.g., by addition of additional fuel or oxidizer particulates. Accordingly, the thermoplastic elastomer of the propellant composition provides for its eventual recycle, as opposed to the burning required for disposal of cross-linked propellant compositions. Because the thermoplastic propellant does not have a "pot life", there is no limitation to the time of casting, and if any problems develop during casting, the process can be delayed as long as necessary, merely by maintaining the propellant formulation in molten form.

For the process of this invention it is necessary to obtain monofunctional A monomer blocks. Such monofunctional A monomer blocks may be formed according to the cationic polymerization process taught in copending U.S. application Ser. No. 07/323,588 filed Mar. 14, 1989 and assigned to Thiokol Corporation, the disclosure of which is incorporated herein by reference thereto. The di-, tri- or tetrafunctional B monomer blocks may also be produced according to the process described in said U.S. application Ser. No. 07/323,588 as well as by any other suitable polymerization technique, such as for example by the technique taught by Manser et al. in U.S. Pat. No. 4,393,199 and in the above-mentioned U.S. Pat. No. 4,483,978.

The polymers are grown from an alcohol. The number of functional hydroxyl groups on the alcohol generally determines the functionality of the polymer chain which grows therefrom; thus, a diol will give rise to a difunctional polymer, a triol to a trifunctional polymer, etc. Preferably, the hydroxyl groups of the polyol are generally unhindered. Suitable diols include, but are not limited to ethylene glycol, propylene glycol, 1,3,-propanediol, and 1,4-butanediol. Suitable triols include, but are not limited to glycerol, trimethylopropane and 1,2,4-butanetriol. Suitable tetraols include, but are limited to, pentaerythritol and 2,2'(oxydimethylene)bis(2-ethyl-1,3,-propanediol), the latter being preferred.

A monofunctional polymer may be formed using a monofunctional alcohol as an initiator. Although a simple alkyl alcohol, such as methanol or ethanol, will give rise to some monofunctional polymer, it is found that superior results are achieved if the initiator alcohol is a primary alcohol with the hydroxyl group on a carbon vicinal to an unsaturated bond.

Examples of preferred monofunctional alcohol initiators are benzyl alcohol and allyl alcohol. Good yields of monofunctional polymer with low polydispersity are achieved through such initiators.

In accordance with the novel method of the invention, thermoplastic elastomers are produced which contain both crystalline polyether A blocks and amorphous polyether B blocks with at least one pair of A blocks flanking at least one B block. The monofunctional A blocks and polyfunctional B blocks are each synthesized separately. The monofunctional crystalline A block is then end-capped with a difunctional isocyanate. The diisocyanate has one isocyanate moiety which is substantially more reactive with the terminal functional groups on the blocks than is the other isocyanate moeity, whereby the more reactive isocyanate moiety tends to react the functional group of the A block, leaving the less reactive isocyanate moiety free and unreacted and thereafter adding di-, tri- or tetrafunctional B blocks to the end-capped A blocks at approximately the stoichiometric ratios they are intended to be present in the thermoplastic elastomer such that the free and unreacted isocyanate moiety on the end-capped monofunctional A block reacts with a functional moiety of the B blocks to produce ABA and $A_nB$ thermoplastics elastomers.

Oxetane and THF/oxetane polymer blocks, synthesized as described above, have terminal hydroxyl functions which are reacted with the diisocyanates in accordance with the invention. An important aspect of the invention is that the end-capping diisocyanate compound have two isocyanates moieties and that one of the isocyanate moieties substantially more reactive with the terminal hydroxyl moieties of the polymer blocks than the other isocyanate moiety. One of the problems with linking these types of polymer blocks is that oxetane derived hydroxyl end groups units have neopentyl structures, whereby the terminal hydroxyl moieties are substantially hindered. The diisocyanate is selected so that one of the isocyanate groups reacts with a terminal hydroxyl group of a monofunctional polymer block while the other isocyanate moiety remains free and unreacted. Diisocyanates are used because isocyanates of higher functionality would result in undesirable cross-linking. The different reactivities of the isocyanate moieties is necessary to ensure that substantial chain extension through linking of like blocks does not occur. Thus, for purposes of this invention, one isocyanate moiety of the diisocyanate should be approximately five times more reactive with terminal hydroxyl groups of oxetane and THF/oxetane blocks than the other group. Preferably one isocyanate moiety is at least about ten times more reactive than the other.

One diisocyanate which is especially useful for purposes of the invention is 2,4 toluene diisocyanate (TDI) in which the isocyanate moiety in the 4 position is substantially more reactive with hindered terminal hydroxyl moieties than the isocyanate moiety in the 2 position. Isophorone diisocyanate (IPDI) is suitable for some applications, though less so than TDI. Examples of diisocyanates which have not worked well include diphenylmethylene diisocyanate (MDI) and hexamethylene diisocyanate (HDI).

In the end-capping reaction, the diisocyanate is used at approximately a stoichiometric molar amount, preferably a slight molar excess, relative to terminal hydroxyl group on the monofunctional polymer chain. Thus, approximately one molar equivalents, e.g., 0.9 to 1.1 molar equivalents of diisocyanate are used. In the ideal reaction, all of the more reactive isocyanate moieties would react with the terminal hydroxyl group of the A blocks, leaving all of the less reactive isocygnate moieties free. Thus, the end-capping reaction may be maximized for particular A polymer chains by some adjustment in the relative molar ratios of polymer block and diisocyanate.

Because the A blocks are first reacted with the diisocyanate, there is no competition of the B blocks for diisocyanate molecules, and end-capping reaction of the A blocks may be carried to substantial completion. The diisocyanate may react more rapidly with one A block than the other, but this difference can be compensated for by a longer reaction time with the slower reacting block. The reactivity of the terminal hydroxyl groups varies according to steric factors and also according to side-chain moieties. Energetic oxetanes, for example, generally have side-chain moieties that are electron-withdrawing, making their terminal hydroxyl groups less reactive. Once end-capped with diisocyanate, the reactivities of the A block polymers for linking purposes is essentially dependent only upon the reactivity of the free isocyanate—not on the chemical makeup of the A polymer chain itself.

The end-capping reaction can be and preferably is carried out in a suitable solvent, i.e., one which dissolves the A block polymer and does not react with the free isocyanate moieties. The reaction is promoted by a suitable urethane catalyst. Lewis acid catalyst and protic acid catalysts are generally suitable. A preferred class of catalysts are organic tin compounds with at least one an preferably two labile groups, such as chloride or acetate, bound directly to the tin. One suitable tin catalyst is diphenyl tin dichloride.

Di-, tri- or tetrafunctional B block polymers are then added to and allowed to react with the resulting isocyanate soft block such as AMMO or 3-methyl-3-(nitratomethyl)oxetane (NMMO), These soft blocks are particularly advantageous because the relatively high reactivity of the hydroxyl endgroups allows the condensation reaction with the less reactive isocyanate of 2,4-TDI to proceed at a reasonable rate. The progress of the reaction can be monitored by both 300 MHz $^1$H NMR and FTIR. These two analytical methods complement and corroborate each other well in this instance. The progress of the isocyanate plus alcohol reaction to afford urethane can be followed easily. In $^1$H NMR spectra, the methylene adjacent to the terminal alcohol has a signal distinct from that same methylene when adjacent to a urethane linkage. These two absorbences can be quantified and compared. During the course of a reaction, the conversion of alcohol termini to urethane linkages can be followed. The carbonyl absorbences of the isocyanate moieties in 2,4-TDI and in the urethane resulting from the condensation of these functional groups with oxetane terminal alcohols are well-defined and strong in an FTIR spectrum, even at the low concentration present in this reaction. This allows, parallel monitoring of the alcohol-to-urethane reaction by $^1$H NMR and the observation by FTIR of the conversion of the isocyanate to urethane based on carbonyl absorbences. Together these methods provide strong evidence that the intended block linking reaction is proceeding as intended. Table I contains data obtained from the analysis of the product of a representative linking reaction.

TABLE I

Representative Results from the Preparation of ABA Materials by Block Linking[a]

| Prepar. | Ratio (AMMO/ BAMO) | GPC Mw | GPC Mn | GPC Disp | NMR MW | End-groups (AMMO/ BAMO) | Block Factor | Block Index | Hydr. Eq. Wt |
|---|---|---|---|---|---|---|---|---|---|
| A | 100/0 | 12.4 | 6.0 | 2.06 | 7.3 | 100/0 | 0 | 100 | 3546 |
| B | 0/100 | 5.7 | 3.1 | 1.85 | 3.2 | 0/100 | 50 | 100 | 3521 |
| C | 60/40 | 15.5 | 8.1 | 1.92 | 12.6 | 6/94 | 20 | 100 | — |
| Theory | 60/40 | — | — | — | 14.1 | 0/100 | 20 | 100 | — |

[a]Mw, Mn and NMR MW are given in thousands. The block factor is the difference between the reaction of triads resulting from BAMO-BAMO-BAMO and BAMO-BAMO-AMMO, as measured by the fully relaxed $^{13}$C NMR of the quaternary carbons in the polymer, divided by 2. The block index is the sum of the integration of the absorbences of all BAMO-BAMO-BAMO triads and AMMO-AMMO-AMMO triads divided by the total number of triads. The BAMO "endgroups" in the final product are the initiating alcohol used to prepare the monofunctional BAMO hard block. These data show that the reaction proceeds without a significant increase in polydispersity. Determination of the hydroxyl equivalent weight in the product by a titration method was not possible due to interference with the test method by the —NH— moieties of the urethane linkages.

terminated A blocks to form the desired thermoplastic ABA or $A_nB$ elastomers.

The di-, tri- or tetrafunctional B block polymer is added to the elastomers isocyanate-terminated A block polymers in an amount such that the total number of B polymer functional groups approximately equals the number of free isocyanate moieties on the end-capped blocks.

For example, a monofunctional hard block, typically BAMO, is allowed to react with a slight molar excess of 2,4-toluenediisocyanate (2,4-TDI) in the presence of a catalytic amount of diphenyltin dichloride. The large differential reactivity of the two isocyanate functionalities, estimated at a factor of 26.6 when reacting with an unhindered alcohol, precludes any measurable dimerization reaction from occurring. The resulting isocyanate-terminated polymer is then allowed to react with a difunctional or higher functionality The GPC molecular weight increased significantly while the polydispersity of the product is intermediate between the two starting materials. This shows that the linking reaction was largely successful and that side reactions were not significant. The $^1$H NMR molecular weight and endgroup type are both based on the observation that nearly all the terminal alcohol groups were converted to urethanes leaving the pendant chain of the alcohol used to initiate the monofunctional, polymerization of BAMO as the major endgroup. In the case of a block linking reaction, the $^{13}$C NMR block data is somewhat trivial as the polymerizations were carried out separately so the existence of perfect block structure is to be expected.

The invention will now be described in greater detail by way of the following specific examples.

PREPARATION 1

Preparation of a Monofunctional BAMO Polymer

To a stirred solution of 0.51 ml (4.93 mmol) of benzyl alcohol in 23.5 ml of $CH_2Cl_2$ were added 0.18 ml (1.488 mmol) of boron trifluoride etherate and 20 g (119.0 mmol) of BAMO were added. After 268 hours, a small aliquot was removed and diluted with $CDCL_3$ NMR analysis showed the reaction to be essentially complete. The bulk solution was diluted with 50 ml of $CH_2Cl_2$ and 25 ml of saturated aqueous $NaHCO_3$. The phases were separated and the aqueous phase was extracted with 50 ml of $CH_2Cl_2$. The combined organics were dried ($MgSO_4$) then the solvent was removed under reduced pressure to afford a white, crystalline solid. The BAMO polymer product exhibited the following physical properties:

| Property | Value |
| --- | --- |
| Hydroxyl Equivalent Weight | 3521 |
| NMR Molecular Weight | 3200 |
| GPC Mw | 5700 |
| GPC Mn | 3100 |
| GPC Mw/Mn | 1.85. |

PREPARATION 2

Preparation of Polyfunctional AMMO Polymer

To a stirred solution of 0.60 g (6.66 mmol) butanediol and 0,473 g (3.33 mmol) boron trifluoride etherate in 113.56 ml $CH_2Cl_2$ were added 60 g (472.4 mmol) AMMO. After 30 minutes the reaction mixture started to reflux and was cooled with an ice bath to stop reflux. The ice bath was removed after ten minutes and the reaction permitted to proceed. The reaction was quenched after 75 hours and the AMMO product isolated. The product has the following properties:

| Property | Value |
| --- | --- |
| Hydroxyl Equivalent Weight | 3546 |
| GPC Mw | 12400 |
| GPC Mp | 9670 |
| GPC Mn | 6010 |
| GPC Mw/Mn | 2.06. |

PREPARATION 3

Preparation of a Polyfunctional NMMO Polymer

To a stirred solution of 0.09016 g (1.0 mmol) butanediol and 0.50 ml (0.5 mmol) $Et_3OBF_4$ in 43 ml of $CH_2Cl_2$ were added 30 g (204.1 mmol) NMMO and heated to reflux under nitrogen until the reaction was about 95.3% completed. Work up of the reaction product produced a NMMO polymer having the following properties:

| Property | Value |
| --- | --- |
| GPC Mp | 17600 |
| GPC Mw | 21400 |
| GPC Mn | 8850 |
| GPC Mw/Mn | 2.42. |

PREPARATION 4

Preparation of Monofunctional BAMO Polymer

To a solution of 0.556 g (5.142 mmol) benzyl alcohol and 0.213 g (0.8570 mmol) $Et_3OPF_6$ in 35.23 ml $CH_2Cl_2$ was added 30 g (17.84 mmol) BAMO. After a few minutes the reaction had a violent reflux. The reaction was cooled down to room temperature and stirred. After 2½ hours a NMR sample was taken and evidenced a 96% reaction completion. Work up of the reaction product yielded a monofunctional BAMO polymer having the following properties:

| Property | Value |
| --- | --- |
| GPC Mp | 7530 |
| GPC Mw | 9640 |
| GPC Mn | 4800 |
| GPC Mw/Mn | 2.01. |

PREPARATION 5

Preparation of a Monofunctional BAMO Polymer

To a stirred solution of 1.11 ml (10.7 mmol) benzyl alcohol and 0.250 g (5.35 ml) boron trifluoride etherate in 97.59 ml $CH_2Cl_2$ were added 36.36 g (267.9 mmol) BAMO. After about 2¾ hours the reaction was quenched and worked up by adding 200 ml $CH_2Cl_2$, 100 ml of saturated aqueous $NaHCO_3$. The phases were separated and the $NaHCO_3$ aqueous phase was extracted with 150 ml $CH_2Cl_2$. The combined organics were dried ($MgSO_4$) then the solvent removed under a rotary evaporator. The product was washed with hexanes and the product again isolated under a rotary evaporator producing a BAMO polymer product having the following properties:

| Property | Value |
| --- | --- |
| Hydroxyl Equivalent Weight | 3355 |
| GPC Mw | 4890 |
| GPC Mp | 4230 |
| GPC Mn | 2770 |
| GPC Mw/Mn | 1.77. |

PREPARATION 6

Preparation of a Polyfunctional AMMO Polymer

To a stirred solution of 0.85 g (9.449 mmol) butanediol and 0.67 g (4.745 mmol) boron trifluoride etherate in 95.17 ml $CH_2Cl_2$, 60 g (472.4 mmol) AMMO were added under nitrogen. After 29 hours NMR analysis showed the reaction to be essentially complete. To the reaction mixture solution was added 100 ml $CH_2Cl_2$ and 50 ml saturated aqueous $NaHCO_3$. The phases were separated and the aqueous phase was extended with 100 ml $CH_2Cl_2$. The combined organic phases were dried with $MgSO_4$ and the solvent stripped off with a rotary evaporator to afford the AMMO polymer. The product had the following properties:

| Property | Value |
| --- | --- |
| Hydroxyl Equivalent Weight | 3125 |
| GPC Mw | 10860 |
| GPC Mp | 7150 |
| GPC Mn | 5040 |
| GPC Mw/Mn | 2.14. |

PREPARATION 7

Preparation of a Mono-functional BAMO Polymer

To a stirred solution of 0.93 ml (9.0 mmol) of butanediol in 35 ml of $CH_2Cl_2$ were added 0.37 g (1.5 mmol) of $Et_3OPF_6$ followed by 30.0 g (179 mmol) of BAMO. After 20 minutes, the reaction mixture is diluted with $CH_2Cl_2$ and saturated aqueous $NaHCO_3$. The phases were separated and the aqueous phase was washed with 50 ml of $CH_2Cl_2$. The combined organic phases were dried with $MgSO_4$ and the solvent was removed under reduced pressure to afford the crystalline BAMO polymer. The product had the following properties:

| Property | Value |
| --- | --- |
| NMR MW | 4423 |
| GPC Mn | 3950 |
| GPC Mw | 6635 |
| GPC Mw/Mn | 1.68. |

PREPARATION 8

Preparation of a Trifunctional NMMO Polymer

To a stirred solution of 1.15 g (8.3 mmol) of trimethylolpropane in 140 ml of $CH_2Cl_2$ were added 0.77 ml (6.25 mmol) of $BF_3$—$OEt_2$ followed by 100 g (680 mmol) of NMMO. After 72 hours, the reaction mixture is diluted with 100 ml $CH_2Cl_2$ and 25 ml of saturated aqueous $NaHCO_3$. The phases were separated and the aqueous phase was washed with 100 ml of $CH_2Cl_2$. The combined organic phases were dried with $MgSO_4$ and the solvent was removed under reduced pressure to afford the amorphous NMMO polymer as a clear viscous liquid. The product had the following properties:

| Property | Value |
| --- | --- |
| Hydroxyl Equivalent Weight | 3759 |
| GPC Mn | 8660 |
| GPC Mw | 13530 |
| GPC Mw/Mn | 1.56. |

PREPARATION 9

Preparation of a Tetrafunctional NMMO Polymer

To a stirred solution of 1.56 g (8.3 mmol) of 2,2'(oxydimethylene)bis(2-ethyl-1,3-propanediol) in 140 ml of $CH_2Cl_2$ were added 0.77 ml (6.25 mmol) of $BF_3$—$OEt_2$ followed by 100 g (680 mmol) of NMMO. After 24 hours, the reaction mixture is diluted with 100 ml $CH_2Cl_2$ and 25 ml of saturated aqueous $NaHCO_3$. The phases were separated and the aqueous phase was washed with 100 ml of $CH_2Cl_2$. The combined organic phases were dried with $MgSO_4$ and the solvent was removed under reduced pressure to afford the amorphous NMMO polymer as a clear viscous liquid. The product had the following properties:

| Property | Value |
| --- | --- |
| Hydroxyl Equivalent Weight | 3497 |
| GPC Mn | 8630 |
| GPC Mw | 13100 |
| GPC Mw/Mn | 1.52. |

EXAMPLE 1

Preparation of an ABA Triblock Polymer (BAMO-AMMO-BAMO)

To a stirred solution of 4.0 g (1.24 mmol) of a monofunctional BAMO polymer (Preparation 1) in 8 ml of $CH_2Cl_2$ were added 0.193 ml (1.36 mmol) of 2,4-toluenediisocyanate and 0.004 g (0.012 mmol) of diphenyltin dichloride. After 18 hours, $^1H$ NMR analysis suggests a high percentage of alcohol endgroups had been converted to urethanes. FTIR shows strong isocyanate and urethane absorbances. To this solution were added 4.52 g (0.62 mmol) of a difunctional AMMO polymer (Preparation 2) in 10 ml of $CH_2Cl_2$. After 45 hours more, FTIR shows no isocyanate absorbance. $^1H$ NMR shows that a high percentage of AMMO endgroups had reacted. The product was isolated by removal of all volatiles under reduced pressure. The product exhibited the following properties:

| Property | Value |
| --- | --- |
| NMR Molecular Weight | 12600 |
| GPC Mw | 15500 |
| GPC Mn | 8100 |
| GPC Mw/Mn | 1.92. |

EXAMPLE 2

Preparation of an ABA Triblock Polymer (BAMO-NMMO-BAMO)

To a stirred solution of 10.94 g (1.53 mmol) of a monofunctional BAMO polymer (Preparation 4) dissolved in 25 ml of $CH_2Cl_2$ under nitrogen were added 0.272 ml (1.91) mmol) of 2,4-toluenediisocyanate and 0.020 g of diphenyltin dichloride. After 96 hours, $^1H$ NMR analysis demonstrates a high percentage of alcohol endgroups converted to urethanes. FTIR shows an urethane/isocyanate ratio of 0.67. To this solution was added 13.0 g (0.76 mmol) of a difunctional NMMO polymer (Preparation in 35 ml of $CH_2Cl_2$. After 360 hours more FTIR showed that no isocyanate groups were left. The product was isolated by precipitation in methanol to remove the catalyst. The product exhibited the following properties:

| Property | Value |
| --- | --- |
| $E^{1.0}$ | 3484 psi |
| $E_m^1$ | 8% |
| Tm | 202 psi |
| Shore A hardness | 53 |
| GPC Mw | 28000 |
| GPC Mn | 11400 |
| GPC Mw/Mn | 246. |

EXAMPLE 3

Preparation of an ABA Triblock Polymer (BAMO-AMMO-BAMO)

To a stirred solution of 2.0 g (0.596 mmol) of a monofunctional BAMO polymer (Preparation 5) dissolved in 8 ml of $CH_2Cl_2$ under argon were added 0.093 ml (0.654 mmol) of 2,4-toluenediisocyanate and a trace amount of diphenyltin dichloride. After 24 hours $^1H$ NMR analysis showed >95% of the hydroxyl moieties reacted. FTIR showed an urethane/isocyanate ratio of 0.96. To the solution was added 1.8 g (0.297 mmol) AMMO polymer (Preparation 6) in 8 ml $CH_2Cl_2$. After 144 hours more the FTIR ratio is approximately 7.5. After another 24 hours the $CH_2Cl_2$ is gone. The product is redissolved and FTIR shows essentially no isocyanate moieties. The product was isolated on a rotary evaporator under high vacuum. The product exhibited the following physical properties:

| Property | Value |
| --- | --- |
| GPC Mw | 11200 |
| GPC Mn | 5970 |
| GPC Mp | 9510 |
| GPC Mw/Mn | 1.88. |

EXAMPLE 4

Preparation of a Three-arm Star Polymer—($A_3B$)

To a stirred solution of 2.2 g (0.50 mmol) of a monofunctional BAMO polymer (Preparation 1) in 10 ml of $CH_2Cl_2$ were added 0.085 ml (0.60 mmol) of 2,4-toluene-diisocyanate and approximately 0.004 g (0.012 mmol) of diphenyltin dichloride. The reaction was allowed to proceed until $^1H$ NMR analysis showed that greater than 90% of the BAMO hydroxyl endgroups had been converted to urethanes, 1.88 g (0.17 mmol) of trifunctional NMMO (Preparation 8) dissolved in 10 ml of $CH_2Cl_2$ were added. The reaction was allowed to proceed until FTIR analysis verified that all isocyanate had been converted to urethane. The reaction mixture was poured into 50 ml of methanol and the product isolated by filtration. The product had the following properties:

| Property | Value |
| --- | --- |
| GPC Mn | 7930 |
| GPC Mw | 18670 |
| GPC Mw/Mn | 2.35. |

EXAMPLE 5

Preparation of a Four-arm Star Polymer—($A_4B$)

To a stirred solution of 2.2 g (0.50 mmol) of a monofunctional BAMO polymer (Preparation 7) in 10 ml of $CH_2Cl_2$ were added 0.085 ml (0.60 mmol) of 2,4-toluene-diisocyanate and approximately 0.004 g (0.012 mmol) of diphenyltin dichloride. The reaction was allowed to proceed until $^1H$ NMR analysis showed that greater than 90% of the BAMO hydroxyl endgroups had been converted to urethanes, 1.75 g (0.12 mmol) of tetrafunctional NMMO (Preparation 9) dissolved in 10 ml of $CH_2Cl_2$ were added. The reaction was allowed to proceed until FTIR analysis verified that all isocyanate had been converted to urethane. The reaction mixture was poured into 50 ml of methanol and the product isolated by filtration. The product had the following properties:

| Property | Value |
| --- | --- |
| GPC Mn | 9025 |
| GPC Mw | 21400 |
| GPC Mw/Mn | 2.37. |

In the above described preparations and experiments $^1H$ NMR spectra were recorded with a Varian XL-300 spectrometer operating at 300 MHz. $^{13}C$ NMR spectra were recorded with the same instrument operating at 75 MHz. Spectra were obtained on $CDCl_3$ solutions using residual $CHCl_3$ as internal standard. FTIR spectra were recorded with a Nicolet 20DX on dilute $CH_2Cl_2$ solutions. GPC traces were obtained with a waters LC for GPC using THF as the mobile phase and a differential refractometer detector. A series of four microstyragel columns was used ranging in porosity from $10^5$ to $10^2$ Å. Polyethylene-glycoladipate was used as a broad molecular weight calibration standard. Hydroxyl equivalent weight was determined by reaction with tosylisocyanate in THF followed by titration of the urethane with t-butylammonium hydroxide.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A method of preparing a thermoplastic elastomer having A blocks and at least one B block, wherein said A blocks are crystalline at temperatures below about 60° C. and said B block is amorphous at temperatures above about −20° C., said A blocks each being polyethers derived from monomers of oxetane and its derivatives and/or tetrahydrofuran and its derivatives, the method comprising:

providing monofunctional hydroxyl terminated A blocks which are crystalline at temperatures below about 60° C. and separately providing di-, tri- or tetrafunctional hydroxyl terminated B blocks which are amorphous at temperatures above about −20° C., end-capping said A blocks by separately reacting said A blocks with a difunctional diisocyanate in which one isocyanate moiety is at least about five times as reactive with the terminal hydroxyl group of the A blocks as the other isocyanate moiety, whereby the more reactive isocyanate moiety tends to react with the terminal hydroxyl group of the A blocks, leaving the less reactive isocyanate moiety free and unreacted, and adding di-, tri- or tetrafunctional B block to the end-capped A blocks at approximately the stoichiometric ratios that they are intended to be present in the thermoplastic elastomer such that the free and unreacted isocyanate moiety on the end-capped A block reacts with a functional moiety of the B block to produce ABA or $A_nB$ thermoplastic elastomers.

2. The method according to claim 1 wherein said oxetane monomers have the general formula:

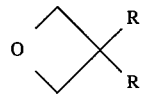

wherein the R groups are the same or different and are selected from moieties having the general formula: $-(CH_2)_nX$, where n is 0–10 and X is selected from the group consisting of —H, —$NO_2$, —CN, —Cl, —F, —O-alkyl, —OH, —I, —$ONO_2$, —N ($NO_2$) -alkyl, —C≡CH, —Br, —CH=CH (H or alkyl), —O—CO—(H or alkyl), —$CO_2$—(H or alkyl), —N(H or alkyl)$_2$, —O—$(CH_2)_{1-5}$—O—$(CH_2)_{0-8}$—$CH_3$, and —$N_3$.

3. A method according to claim 1 wherein said THF monomers have the general formula:

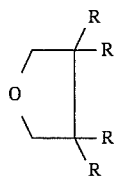

wherein the R groups are the same or different and are selected from moieties having the general formula: $-(CH_2)_n X$, where n is 0–10 and X is selected from the group consisting of —H, —$NO_2$, —CN, —Cl, —F, —O-alkyl, —OH, —I, —$ONO_2$, —N($NO_2$)-alkyl, —C≡CH, —Br, —CH=CH(H or alkyl), —O—CO—(H or alkyl), —$CO_2$—(H or alkyl), —N(H or alkyl )$_2$, —O—$(CH_2)_{1-5}$—O—$(CH_2)_{0-8}$—$CH_3$, and —$N_3$.

4. A method according to claim 1 wherein said B block is di-, tri- or tetrafunctional and has a molecular weight of between about 5000 and about 50,000 and each of said monofunctional A blocks has a molecular weight of between about 3000 and about 12,500.

5. A method according to claim 1 wherein said monofunctional A blocks together have a molecular weight between about ⅓ and about 1 times the molecular weight of said B block or total weight of said B blocks.

6. A method according to claim 1 wherein said A block is selected from the group consisting of poly(3,3-bis(ethoxymethyl)oxetane), poly(3,3-bis (methoxymethyl)oxetane), poly(3,3-bis (fluoromethyl)oxetane), and poly(3,3-bis(azidomethyl)oxetane).

7. A method according to claim 1 wherein said B block is selected from poly (3-azidomethyl-3-methyloxetane), (3-azidomethyl-3-methyloxetane)/3,3-bis(azidomethyl) oxetane copolymer, tetrahydrofuran/3,3-bis(azidomethyl)oxetane copolymer, tetrahydrofuran/3-azidomethyl-3-methyloxetane copolymer, tetrahydrofuran/3-octoxymethyl-3-methyloxetane copolymer, tetrahydrofuran/3,3-bis (methoxyethoxymethyl)oxetane copolymer, tetrahydrofuran/3,3-bis(ethoxymethyl)oxetane copolymer, tetrahydrofuran/3,3-bis(methoxymethyl)oxetane copolymer, tetrahydrofuran/3,3-bis(fluoromethyl)oxetane copolymer, poly(3-nitratomethyl-3-methyloxetane), and 3,3-bis(azidomethyl oxetane/3-nitratomethyl-3-methyloxetane) copolymer.

8. A method according to claim 1 wherein said oxetane monomers are selected from the group consisting of:

3,3-bis(ethoxymethyl)oxetane, 3,3-bis(chloromethyl)oxetane, 3,3-bis(methoxymethyl)oxetane, 3,3-bis(fluoromethyl)oxetane, 3-hydroxymethyl-3-methyloxetane, 3,3-bis(acetoxymethyl)oxetane, 3,3-bis(hydroxymethyl)oxetane, 3-octoxymethyl-3-methyloxetane, 3,3-bis(methoxyethoxymethyl)oxetane, 3-chloromethyl-3-methyloxetane, 3-azidomethyl-3-methyloxetane, 3-3-bis(iodomethyl)oxetane, 3-iodomethyl-3-methyloxetane, 3-propynomethylmethyloxetane, 3,3-bis(nitratomethyl)oxetane, 3-nitratomethyl-3-methyloxetane, 3,3-bis(methylnitraminomethyl)oxetane, 3-methylnitraminomethyl- 3-methyloxetane, and 3,3-bis(azidomethyl)oxetane.

9. A method according to claim 1 wherein said diisocyanate is toluene diisocyanate.

10. A method according to claim 1 wherein said reactions are each conducted in the presence of an urethane catalyst.

11. A method according to claim 1 wherein said B block is difunctional whereby an ABA polymer is produced.

12. A method according to claim 1 wherein in said end-capping reaction said diisocyanate is provided at between about a 0.9 and about a 1.1 molar ratio in regard to the mols of hydroxyl groups in the monofunctional A block.

13. A method according to claim 1 wherein said B block is tri- or tetrafunctional whereby an $A_n B$ star block polymer is produced.

* * * * *